Feb. 10, 1953  F. W. KUNATH  2,627,625
CURTAIN CARRIER
Filed March 8, 1951  2 SHEETS—SHEET 1
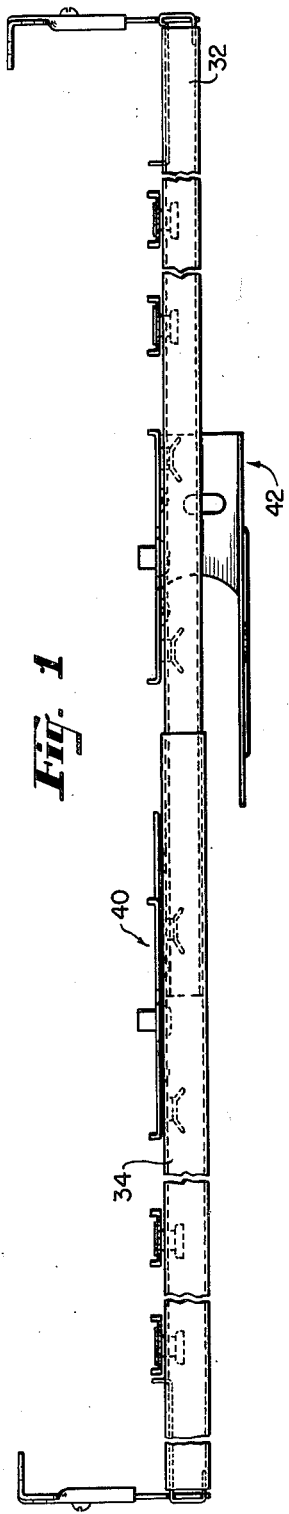
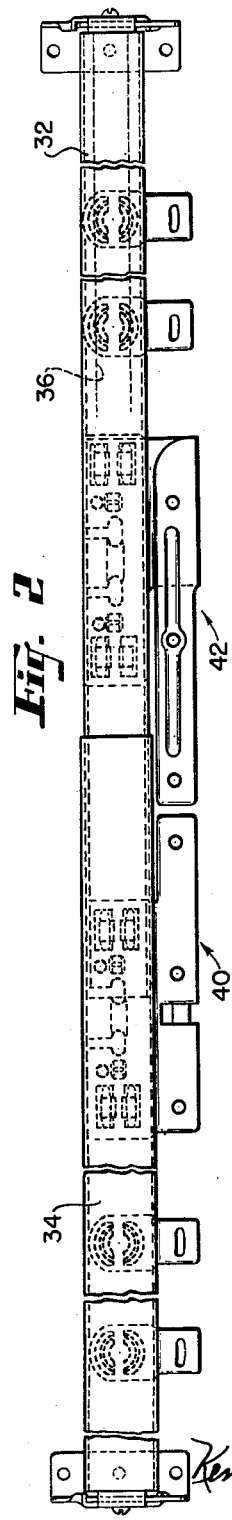
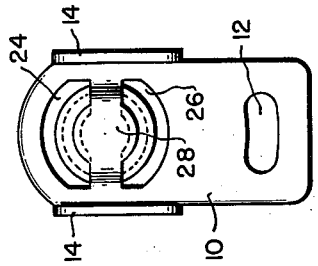
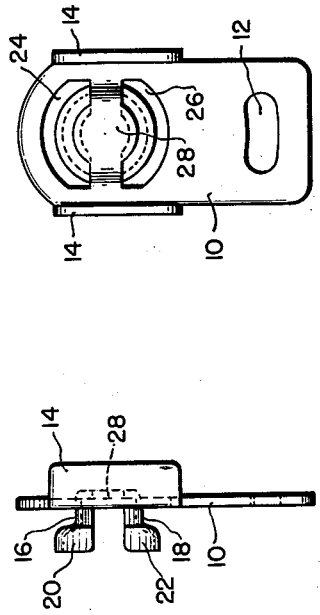
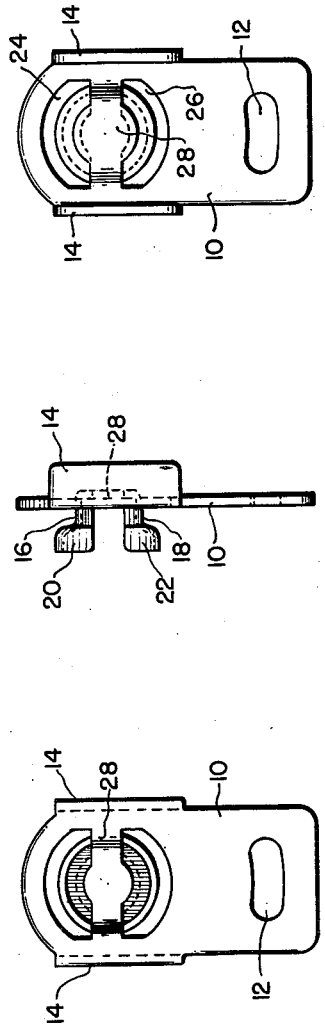
Inventor.
Fred W. Kunath
by Kenway, Jenney, Witter & Hildreth
Attys.

Feb. 10, 1953 F. W. KUNATH 2,627,625
CURTAIN CARRIER

Filed March 8, 1951 2 SHEETS—SHEET 2

*Inventor.*
by Fred W. Kunath
Kenway, Jenney, Witter & Hildreth
Attys.

UNITED STATES PATENT OFFICE 2,627,625

CURTAIN CARRIER

Fred W. Kunath, Cranston, R. I., assignor to Kenney Manufacturing Company, Cranston, R. I., a corporation of Rhode Island Application March 8, 1951, Serial No. 214,610

8 Claims. (Cl. 16—93)

This invention relates to curtain suspension mechanism of the traverse rod type and more particularly to idler carriers and master carriers employed therein.

Conventional traverse curtain suspension arrangements generally employ hollow C-sectioned curtain rods mounted across the top of a window or door frame either in single rods of measured length or with two such rods in telescoping relation. The slot formed by the opening of the C section is faced to the rear toward the supporting frame and curtain carriers are provided in the slot to support the curtain in sliding relation to the rod. When two curtains are mounted with drawstrings to open and close them, master carriers are employed to support and overlap their adjacent inner edges and the drawstrings communicate through the rod to the master carriers. Idler carriers to each side of the master carriers support the remaining areas of the curtains.

It is an object of my invention to provide a simple, light-weight, noiseless, and inexpensive construction for carriers in which the retaining member will not interfere with curtain drawstrings, and in which the weight-supporting elements will be adapted for smooth sliding along the rod.

Another object of my invention is to provide a one-piece, stamped metal construction for idler carriers and master carriers which will be solid in construction, which will not require an assembly operation after formation of its elements, and which will not tend to come apart after extended use.

In the accomplishment of these and other objects of my invention, I employ a master carrier and an idler carrier formed from sheet metal and die stamped to provide inwardly extending rounded weight-supporting projections and rounded retaining members on the said projections.

It is a feature of the carrier of my invention that it is a single piece, metal stamping in which there are two partly rounded shank portions, one of which is the weight-supporting member and both of which are provided with rounded retaining elements for holding the carrier in the curtain rod slot. These elements may be readily formed from a single piece of sheet metal by conventional stamping operations. Furthermore, as formed, they present rounded surfaces to the weight-bearing edge of the curtain rod slot and for that reason slide smoothly and noiselessly thereon. A further advantage of this construction is that the joint between the rounded shank and the base plate from which it is formed is curved and thus forms an essentially rigid connection as will be explained more in detail below.

It is an additional feature of my invention that the retaining elements are in vertically spaced relationship with a gap between them, thereby providing more space for the drawstrings and minimizing interference between the retaining elements of the carrier and the drawstrings.

There are two types of master carrier of my invention. Both have the same main body but one is adapted with an overlap arm to bypass the other and carry the inner edges of adjacent curtains into overlapping relationship. In addition to the features mentioned above, the master carrier of my invention is provided with inwardly bent, ski-shaped runners which facilitate passage of the carrier over the projection of the inner of two telescoping curtain rods.

Further objects and features of my invention can be best understood and appreciated from a detailed description of a preferred embodiment thereof selected for purposes of illustration and shown in the accompanying drawings, in which:

Fig. 1 is a plan view of a telescoping curtain rod broken off in appropriate places for purposes of convenience of illustration, and fitted with the idler carriers and master carriers of my invention;

Fig. 2 is a view in front elevation of the arrangement shown in Fig. 1;

Fig. 3 is a view in front elevation of an idler carrier of my invention;

Fig. 4 is a view in side elevation of the idler carrier shown in Fig. 3;

Fig. 5 is a view in rear elevation of the idler carrier shown in Fig. 3;

Figure 6:
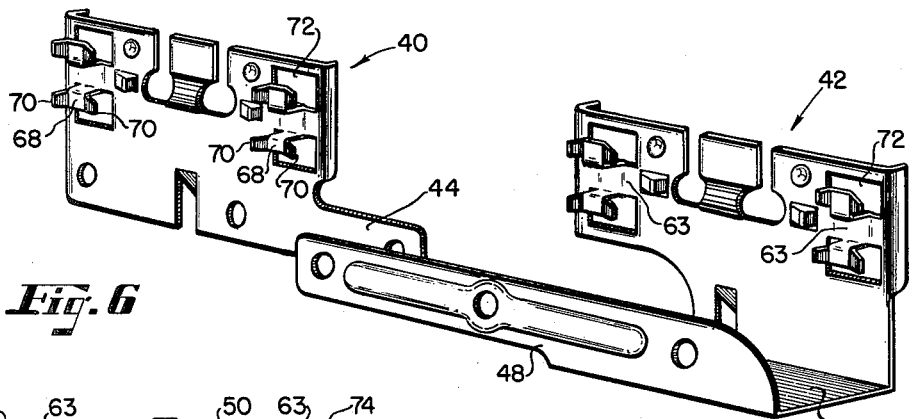
Fig. 6 is a view in perspective of both types of master carrier of my invention.

In describing the preferred embodiment of my invention herein shown, I will first describe the idler carrier shown in Figs. 3–5, and thereafter describe the master carriers shown in Figs. 6–12.

The idler carrier herein shown comprises a base plate 10 preferably of sheet steel with a perforation 12 in its lower section adapted to receive a curtain supporting hook. Along the upper sides of the plate 10, two flanges 14 are bent to the rear, normal to the plane of the plate 10. These flanges 14 serve both to provide longitudinal rigidity to the plate and to prevent the carriers from wedging under each other in locked relation while sliding together in the slot of a curtain rod. The upper area of the plate 10 between the flanges 14 is punched and stamped to form supporting and retaining elements which include an upper shank portion 16, a lower shank portion 18, a semi-cup-shaped retaining element 20 integral with the shank 16 and a semi-cup-shaped member 22 integral with the shank 18. These shank and cup elements when stamped leave perforations 24 and 26 in the base plate 10 and a cross bar 28 which supports them. The shank portions 16 and 18 are part cylindrical in cross section and since they are formed integrally with the relatively flat cross bar 28 and normal thereto an extremely rigid joint between them is formed. These elements may be formed by conventional punching and die stamping operations.

It should be noted that the cross bar 28 is not perfectly flat, but that it bends slightly to the rear as may be seen in dotted lines in Fig. 4. The reason for this is to provide a more rigid support for the shanks than a perfectly flat cross bar could provide, and also to hold the radius between the shanks and the cross bar well to the rear and clear of the edges of the curtain rod slots. If this radius is more forward, there is a chance that the edge of the curtain rod slot would tend to wedge in the angle formed between the curved part of the shank in the area of the joint and the plane of the base plate 10.

Figs. 1 and 2 show carriers of my invention mounted on a curtain rod having telescoping sections 32 and 34. It will be seen that the carriers are supported in a rear slot 36 partly shown in dotted lines in Fig. 2 of the curtain rod with the shank 18 taking the principal part of the weight and with semi-circular cups 20 and 22 retaining the carrier within said slot 36 by overlapping the edges on the inside of the slot 36. It will also be seen that the surface of contact of the shank 18 resting on the supporting edge of the curtain rod slot 36 is radial in shape and therefore will slide more easily and more noiselessly along the rod.

As may be seen in Fig. 4, there is a substantial gap between the shanks 16 and 18 and the cups 20 and 22 wherein drawstrings (not shown) may pass without becoming jammed. The shape of the cups 20 and 22 being rounded further promotes passage of the carrier over random deformities in the shape of the rod and the step caused by the inner rod 32 in telescoping relation with rod 34. It will be noted that the idler carriers may tilt as they are drawn along the rod, but that the semi-cup-shape of the retaining elements ensures a rounded surface of contact with the rod regardless of any normally encountered degree of tilt.

The master carriers of my invention include a left master carrier 40 and a right master carrier 42. This terminology is employed merely for the convenience of distinguishing carrier 40 from carrier 42 as they are normally used in the industry. It will be seen, however, that the positioning of these carriers may be reversed merely by re-positioning the arms presently to be described. The main bodies of the master carriers 40 and 42 are identical and therefore they will be described together using the same reference numerals. In fact, the principal difference between the master carriers 40 and 42 is that the left carrier has an arm 44 in the same plane as the base plate of the carrier, while the right carrier 42 has a forwardly extending bottom flange plate 46 which passes underneath the curtain rod and supports an overlap arm 48 in a plane forward of the base plate. The arms 44 and 48 are adapted to bring the inner leading edges of two curtains into overlapping relationship when the master carriers are brought together in the rod by drawstrings.

The rod engaging and supporting arrangement for the master carriers comprises a base plate 50 perforated in its upper margin to provide two slots 52 and an upstanding arm 54 therebetween. In its lower margin the plate 50 is stamped to provide a slot 56 and a rearwardly extending hook 58 formed from the metal formerly in the slot 56. These latter mentioned elements may be employed in securing a drawstring to the master carrier by passing a drawstring through one slot 52 from the forward side of the plate, then passing the drawstring down and around the hook 58, and thereafter returning it up and forward through the other slot 52.

In the upper area at each end of the plate 50, two sets of supporting and retaining elements are formed by conventional die stamping in a manner similar to the formation of shanks 16 and 18 described above. Shanks 60 and 62 extend forward and are integral at their bases with a supporting cross bar 63 which remains between them. The shanks 60 and 62 have an additional section of metal at each of their ends and this latter section is bent into a plane essentially parallel to the plane of plate 50 to form retaining elements 68 and bent forward at each end to form ski runners 70. When these supporting and retaining elements are formed, perforations 72 remain in plate 50.

Figure 8:
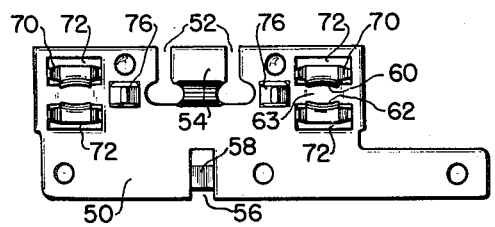
Fig. 8 is a view in front elevation of the left hand master carrier shown in Fig. 6.
Figure 12:
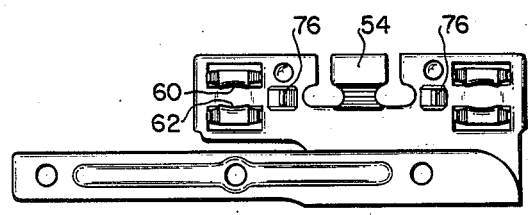
Fig. 12 is a view in front elevation of the right hand master carrier shown in Fig. 6.

With particular reference to Figs. 8 and 12 it will be seen that the shanks 60 and 62 are slightly curved in cross section. This curve of shanks 60 and 62 is not as pronounced as that of shanks 16 and 18 of the idler carriers, but they are curved essentially for the same purposes of promoting smooth and silent sliding of the master carriers in the slot 36. The reason for the less pronounced curve is that the master carriers, being supported in two places, cannot rock while being drawn, as the idler carriers do when they are drawn.

The master carriers are provided with rearwardly extending flanges 74 at each end of plate 50, the flanges 74 are constructed similarly to the flanges 14 of the idler carrier described above and serve the same purposes.

Figure 7:
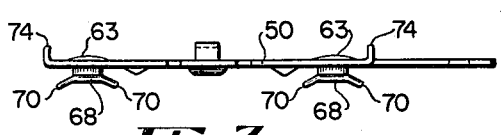
Fig. 7 is a plan view of the left hand master carrier shown in Fig. 6.
Figure 10:
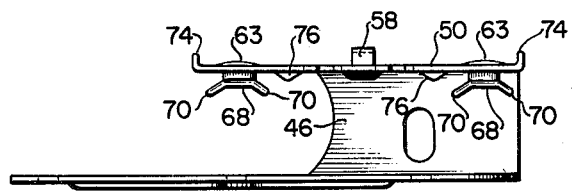
Fig. 10 is a plan view of the right hand master carrier shown in Fig. 6.

With particular reference to Figs. 7 and 10 it will be seen that the cross bars 63 rather than lying directly in the plane of the plate 50 bend slightly to the rear thereof in a manner similar to the cross bar 28 of the idler carrier described above. The reasons for this slight rearward bend are to insure a smooth sliding contact between the weight-supporting shanks 62 and the lower edge of slot 36 of the curtain rod, and to increase the strength of the support connection.

Figure 9:
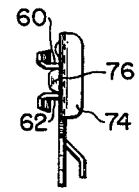
Fig. 9 is a view in side elevation of the left hand master carrier shown in Fig. 6.
Figure 11:
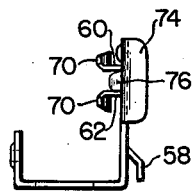
Fig. 11 is a view in side elevation of the right hand master carrier shown in Fig. 6.

With reference to Figs. 9 and 11 it will be seen that there is a substantial gap between shanks 60 and 62 thereby providing additional space for drawstrings to pass within the curtain rod, free of the retaining elements. However, in order to keep the drawstring from coming so far back as to jam in the curtain rod slot in the area of the master carriers small humps 76 are provided in plate 50 by indenting the said plate during the stamping operation.

The idler carrier of Figs. 3–5 and the master carriers of Figs. 6–12 to a certain extent embody essentially the same inventive concept; namely, that of providing rounded weight-bearing elements and curved retaining elements in a single piece, stamped sheet metal member. Furthermore the shanks 60 and 62 of the master carriers, and shanks 16 and 18 of the idler carriers are all curved in cross section and lie in a plane normal to their supporting bases. It was also seen that the cross bars 28 in the idler and 63 in the master recede slightly to the rear of the carrier base plate for the same reasons. The runners 70 of the master carriers, of course, are not formed in the semi-cup shape of elements 20 and 22, but as was explained, the master carriers cannot rock because they are supported in the slots 36 in two places, and therefore the runners 70 need only be curved and need not be in the form of semi-cups as are elements 20 and 22. In operation, however, the curved surfaces presented by my supporting and retaining elements promote smooth sliding, particularly over the steps formed by the telescoping curtain rods. Therefore, in the claims I intend the term "carrier" to include both idler carriers and master carriers.

Since certain minor changes in the preferred embodiment of my invention herein shown will be obvious to those skilled in the art, it is not intended to confine the invention to the precise form herein shown, but rather to limit it in terms of the appended claims.

Having thus described and disclosed preferred embodiments of my invention, what I claim as new and desire to secure by Letters Patent is:

1. A curtain carrier for a slotted traverse curtain rod comprising, a sheet metal base plate adapted to be disposed in a vertical plane, said base plate being perforated in at least two separate places with the metal between said perforations defining a cross bar, a part of the metal which formerly occupied each said perforation being integral with said cross bar and standing forward to define shank sections in spaced relationship, and a retaining member integral with each said shank section comprising metal bent into a plane substantially parallel to the base plate and extending outwardly of said shank section to overlap the inner edges of the traverse rod slot when the carrier is mounted therein with the shank sections passing through said slot.

2. A curtain carrier for a slotted traverse curtain rod comprising, a sheet metal base plate adapted to be disposed in a vertical plane, said base plate being perforated in at least two separate places with the metal between said perforations defining a cross bar, a part of the metal which formerly occupied each said perforation being integral with said cross bar and standing forward to define shank sections for supporting the carrier in sliding relation in the slot of a traverse rod, retaining members integral with each said shank section bent outwardly of said shanks in a plane substantially parallel to the base plate for overlapping the inner edges of said slot, said retaining members being bent to provide rounded surfaces at each end thereof.

3. The carrier defined in claim 2 further characterized by the shank sections being part cylindrical.

4. The carrier defined in claim 2 further characterized by the cross bar being bent to lie in a plane slightly to the rear of said base plate whereby to hold the joint of the shanks and cross bar to the rear of the edges of the curtain rod slot.

5. A curtain carrier for a slotted traverse curtain rod comprising, a sheet metal base plate adapted to be disposed in a vertical plane, said base plate being perforated in at least two separate places with the metal between said perforations defining a cross bar, a part of the metal which formerly occupied each said perforation being integral with said cross bar and standing forward to define shank sections in spaced relationship, a retaining member integral with each said shank section comprising metal bent into a plane substantially parallel to the base plate and extending outwardly of said shank section to overlap the inner edges of the traverse rod slot when the carrier is mounted therein with the shank sections passing through said slot, and the cross bar being bent to lie in a plane slightly to the rear of said base plate whereby to hold the joint of the shanks and cross bar to the rear of the edges of the curtain rod slot.

6. A curtain carrier for a slotted traverse curtain rod comprising a base plate, rearwardly extending flanges laterally of said base plate and integral therewith, a pair of forwardly bent shank sections in vertically spaced relationship, said shank sections being part cylindrical, a retaining member on the forward end of each said shank section extending outwardly from said shank section to overlap the inner edges of the traverse rod slot, each said retaining member extending longitudinally of said carrier and being formed with a forward curve at each end, and said shank sections and retaining members being integral with and formed from the material of the base plate.

7. The carrier defined in claim 6 further characterized by each retaining member being semi-cup shaped in form and the said forward curve of each retaining member being included within the contour of the semi-cup shaped element.

8. The carrier defined in claim 6 further characterized by a second pair of shank sections in spaced relationship along the base plate, and said retaining members having ski-shaped runners at each end thereof.

FRED W. KUNATH.

REFERENCES CITED

The following references are of record in the file of this patent:

UNITED STATES PATENTS

| Number | Name | Date |
|---|---|---|
| 1,606,580 | Kirsch | Nov. 9, 1926 |
| 1,942,712 | Kirsch | Jan. 9, 1934 |